March 10, 1936.	I. EREMEEFF	2,033,232
ELECTRONIC SOUND PRODUCING SYSTEM
Filed Sept. 24, 1934	7 Sheets-Sheet 1

FIG. 5	INVENTOR.

Ivan Eremeeff

March 10, 1936.　　　I. EREMEEFF　　　2,033,232
ELECTRONIC SOUND PRODUCING SYSTEM
Filed Sept. 24, 1934　　　7 Sheets-Sheet 2

INVENTOR.

March 10, 1936.  I. EREMEEFF  2,033,232

ELECTRONIC SOUND PRODUCING SYSTEM

Filed Sept. 24, 1934   7 Sheets-Sheet 6

INVENTOR.
Ivan Eremeeff

INVENTOR.
Ivan Eremeeff

Patented Mar. 10, 1936

2,033,232

UNITED STATES PATENT OFFICE 2,033,232

ELECTRONIC SOUND PRODUCING SYSTEM

Ivan Eremeeff, Philadelphia, Pa.

Application September 24, 1934, Serial No. 745,278

16 Claims. (Cl. 84—1)

My invention relates to a centralized synthetic electronic sound producing system in combination with one or more distant sound producing and reproducing systems which are controlled by the keyboards of said centralized synthetic electronic sound producing system, and it is an object of my invention to provide a mechanically driven unit for the generation of tones electrically, said unit operating on alternating current to permit one or more similar systems to work in synchronism with it. Said mechanically driven system employs a synchronous or induction repulsion motor, operating on alternating current.

It is another object of my invention to provide said mechanically driven system with a plurality of low voltage light sources which are controlled by keyboards, said light sources being positioned before a plurality of light choppers, which are in the form of revolving discs, drums, or a perforated running belt, for the purpose of keying light impulses, which are projected to photosensitive elements. For the purpose of producing staccato effects in musical tones, single light wire filament light sources are used, since it does not take long for such filaments to respond after the key has been depressed. For producing a diminishing tonal effect, a single heavy wire filament is used, since, while such a filament is slower to respond, it is also slower to cease glowing. Therefore, the effect is opposite that of the staccato effect, being slow in the beginning and slow to fade out. If it is desired to produce the effect of a staccato attack, and a diminishing ending, double filament light sources are used, having both light and heavy wire filaments, so that the light wire glows as soon as contact is made by key, and the heavy wire carries the tone to a diminish.

It is a further object of my invention to provide an intensity controlling arrangement of the light sources, which is accomplished by suitable shutters, resistances, or by painting the globes of the light sources. A plurality of light sources are provided for each row of impulse generators of the light choppers, for the purpose of producing a plurality of tones of the same frequency. The light sources are positioned in such a way that the aperture before each light source is placed at a predetermined angle, for projecting the filament directly onto the eye of the photosensitive element, which detects the impulses.

Another object of my invention is to provide a main unit support which acts as a light source housing, a support for wiring, a support for the motor, and a means for journalling the bearings of the light choppers, etc.

It is also an object to provide shock-absorbing and sound deadening means.

A further object is to provide fixed beat tremolo effects in the musical tones. The pitch is made to fluctuate at all frequencies simultaneously, said tremolo means operating from the same motor which drives the light choppers. To control the tremolo, a pedal is provided, which serves for two keyboards, which will be explained later, said pedal being without clutch attachments, but having a trigger action. The trigger action of the tremolo pedal also acts as a means for sharping and flatting International Pitch, A-440, by separate adjustment in the keyboards.

Another object of this invention is to provide a plurality of specially designed light choppers which run at high speed. Light-weight pulleys of large diameter and wide face are provided for a non-slipping single endless driving belt of uniform thickness. Said light choppers are mounted on suitable well-lubricated bearings and are coated with a non-reflecting surface to prevent any undesirable parasitic noises.

The number of openings in the light choppers are made to conform with the predetermined law of intensity distribution throughout the musical scale, which is known to those skilled in the art of piano tuning. Said light choppers are so designed as to prevent any continuous fluctuation of light on the photosensitve element during the production of light impulses, as will be explained later. In the drawings I show that a perforated running belt can be used, as well as perforated drums, to substitute the discs as light choppers. For the purpose of preventing whistling sounds of the high-speed light choppers, I provide masking means with multi-apertures, which are placed at a distance from the choppers.

The interior of the system is also coated with a non-reflecting material to prevent any undesirable parasitic noises resulting from escaping reflected light. Also, the interior of the system is made sound-proof so that no undesirable sounds are heard externally.

It is another object to provide tone synthesis according to the methods disclosed in my Patent 1,924,713, of August 29, 1933, and my Patent 1,948,169, of February, 1934.

A further object is to provide a system of wiring for the centralized tone generating and synthesizing instrument and for a plurality of distantly located tone producing and reproducing instruments. Each distant instrument is provided with microphone, phonograph, or piezo-electric pick-up means for the production of tones which are controlled by the keyboards of the centralized tone generating and synthesizing instrument.

It is a still further object of this invention to provide multi-switching means for the keys of said centralized instrument, and single switching means for each stop, for synthesizing purposes, as will be explained later.

Another object of this invention is to provide single switching connections of the keys and multi-connections for the stops, and multi-switching means for both keying and stops. In the drawings I have shown a general wiring system of simplified design, and a plan of the synthesis of frequencies, both fundamentals and partials, and other diagrams to explain the wiring of these systems.

Due to the fact that synchronous motors are used in the synthesizing instruments, both keyboards and low-tone pedals of these instruments require no tuning as long as the motors operate without defects.

A still further object is to provide a special compact design for said centralized synthesizing and generating system. The instrument is made portable and of such size that it may easily be transported through standard size doors. A novel pedal arrangement is provided to allow for economy in the width of the console, which carries two keyboards, one row of stops for producing different timbres, by connection with the above-mentioned distant sound producing and reproducing systems, and adjustable volume controls for said stops. If it is desired that low tones should be produced also by pedal, as well as by key, pedals for the purpose are provided, such as in the standard pipe organ, a provision which is made for the reason that the performer's hands are kept very busy with two keyboards, and the row of stops and intensity controls. Since there are two keyboards, two separate volume control pedals are provided, one on each side of the above-mentioned tremolo pedal. Said volume pedals control individually their own alternating current circuits, which are sources of light for the production of impulses when the light choppers are in action. The volume pedals control the flow of alternating current into the light sources.

One row of openings or slits in the light choppers can produce from 1 to 20 frequencies, according to the number of light sources which are placed before them.

It is another object of this invention to key "b" supply current to a plurality of photosensitive elements simultaneously with the keying of current to the light sources for flashing light through one or more light choppers for producing the tonal effects of percussion instrument attacks.

Another object is to provide each distant sound producing and reproducing system with sound emitting means which are controllable by the keyboards of the centralized synthetic electronic tone producing system, a common line connecting all of the sound emitting means of the distant systems to a common sound emitting means which is also controllable by said keyboards.

I do not wish to limit myself to the designs and mechanisms shown in the present drawings, since these may vary according to the adaptation. As far as I am aware, I am the first to employ methods for varying frequencies by mechanical means, in order to produce tremolo effects. Generally, tremolo effects have been produced by variation in volume, or, as in some pipe organs, in combination with variation in frequency.

My invention will be more fully understood from the following specification, reference being had to the accompanying drawings, in which:—

Figure 1:
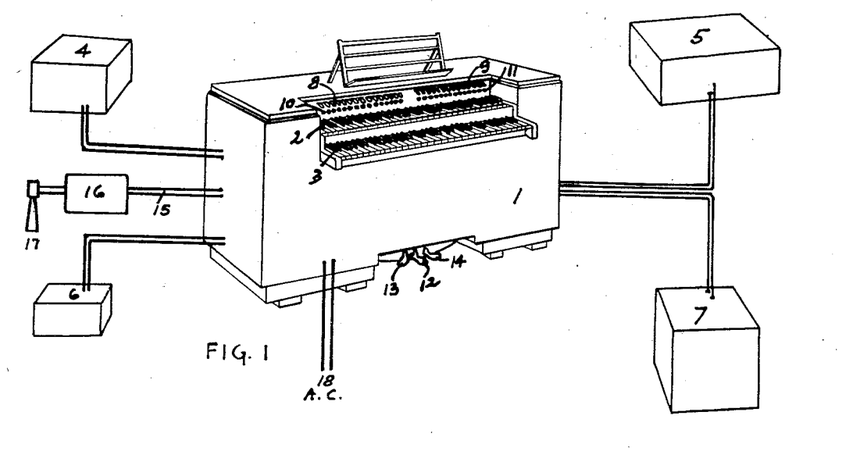
Fig. 1 represents a general view of a synthetic electronic sound generating system.

Fig. 1 represents a general view of a centralized synthetic electronic sound producing system and four distantly located sound producing and reproducing systems. I represents the centralized unit which is housed in a compact console, with two keyboards as 2 and 3, said unit having connection to the distant tone producing and reproducing systems 4, 5, 6, 7.

8, 9, etc., represent stops, and 10, 11, etc., represent their co-operative volume control dials. The stops and volume controls are arranged in two banks, one bank for each keyboard as 2 and 3. 12 represents a tremolo pedal and 13 and 14 are volume control pedals. The outlet line 15 is provided to the amplifier 16 and the sound producer 17. The amplifier 16 also has connection to the distant sound producing and reproducing systems as 4, 5, 6, 7, for automatically amplifying the currents from said distant sound producing and reproducing systems immediately upon operation of either of the keyboards as 2 and 3 of the centralized unit 1.

The console 1 houses a plurality of light sources which are fed by the alternating current line 18. Said light sources are controlled by the keys of keyboards 2 and 3, and are converted into electrical impulses at predetermined frequencies, and predetermined intensities, as will be explained later.

Due to the complicity of the details of this system, whose general plan is shown in Fig. 1, details of parts and wiring are given in the following figures, all numbers referring to parts of the system shown in the present figure.

Figure 2:
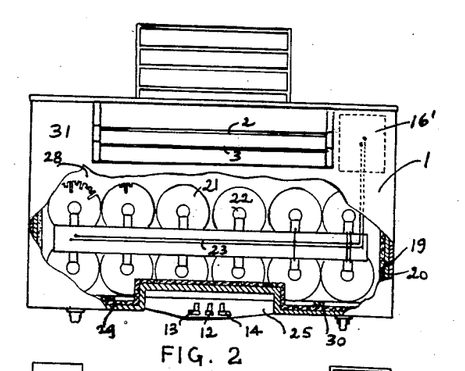
Fig. 2 and Fig. 3 represent end and side view elevations respectively of said system, showing light choppers, pick-ups, pedals, etc.

In the front elevation of the centralized synthetic electronic sound producing system shown in Fig. 2, the console 1 houses the interior cabinet 19, which houses the mechanical unit, and 20 represents a layer of felt or other sound absorbing material for deadening any undesirable sound resulting from the high speed spinning of the light choppers as 21. In this particular instance, the light choppers are shown in the form of revolving discs which have a plurality of rows of slits of doubling number, while, as I have shown in following figures, these may have the form of a running belt.

The bank of photosensitive elements as 22 is connected in parallel by line 23 to the preamplifier 16'. The console is cut into at 25 for the purpose of permitting the feet ample space to manipulate the pedals, which are designed to recede below the actual body of the instrument, for the purpose of compactness, so that only keyboard 5 projects to a certain extent at 27. The volume control pedal 14 serves keyboard 3. The mounting board 28 supports the photosensitive elements, the light choppers, the pulleys which drive said light choppers, the synchronous or induction repulsion motor, light sources, wiring, etc., and is mounted on special rubber cushions as 29 and 30 in a floating condition, in such a manner that any vibrations caused by the moving mechanism is not transmitted to the housing 19, while the interior noise from the mechanism is absorbed by the layer 20.

Figure 3:
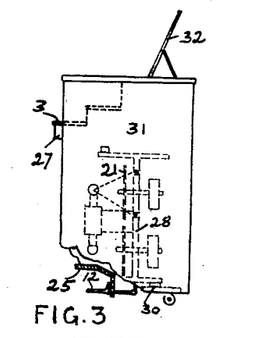

The housing 31, shown in Fig. 2, is provided for the motor which is shown to greater advantage in Fig. 3, and 32 represents an adjustable music sheet support.

Figure 4:
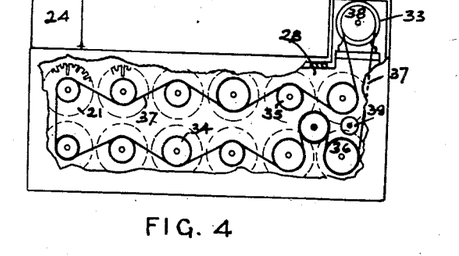
Fig. 4 and Fig. 5 depict front and side view elevations, respectively, of said system, showing the mechanical drive, light choppers, supporting frame, etc.

In Fig. 4, the motor 33, which is of synchronous or induction repulsion type, drives the pulleys 34, 35, 36, etc., with the aid of the single endless non-slipping uniform belt 37, and the motor cone-pulley 38. Said pulleys are of large diameter and wide face, and are made of light weight material. 39 represents a tremolo cam which will be described later in detail. The shafts of the light choppers are well-lubricated and journalled in high-speed bearings.

Figure 5:
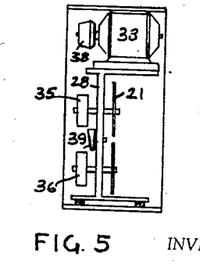

The side view in Fig. 5 shows the light choppers, pulleys, supporting frame, motor, and tremolo device.

Figures 6, 7:
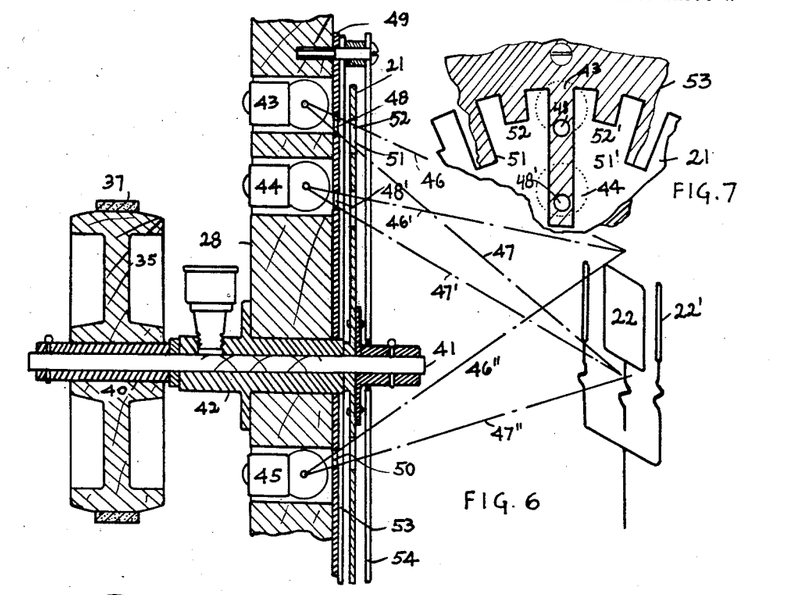
Fig. 6 represents a complete tone generating unit with disc-light choppers, lamps, photosensitive element, etc.
Fig. 7 represents a detail view of a part of what is shown in Fig. 6.

In the detail view of Fig. 6, is shown the pulley 35, which is constructed of wood, with bushing 40, which is mounted on shaft 41 to journal freely without play on the bearing 42. Said bearing is securely pressed into the supporting frame 28, which is drilled out as 43' at predetermined points for the purpose of housing the light sources as 43, 44, 45, etc., in such a manner that when said light sources are illuminated, the filaments are projected on the photosensitive element in such a way that the light spills over the entire surface as shown by the imaginary lines 46 and 47, due to the guarding apertures such as 48 of the shield 49 which is fastened securely to the mounting frame 28. It can be noted that the apertures 48, 48', 50, etc., are placed in such a way that light is projected so that it completely floods the entire photosensitive element as 22, which can be seen by the imaginary lines 46, 46', 46'', and 47, 47', and 47''.

The light sources are positioned in such a manner, co-operative to the slits of the light choppers that the inner ends of the apertures do not pass directly before the working light of the lamps. For example, in Fig. 7, which illustrates a detail of a light chopper, and several light sources as 43 and 44, which are placed before it, it can be seen that the light beam from lamp 43 falls through aperture 48 into slits 51, which pass before it in the path of the photosensitive element.

The slits 51 and 51' are of such length that their lower ends do not come in the path of the working light, which interference would cause additional harmonics, due to its variation. In order to avoid any such parasitic sound, the slits as 51 and 51' are made long enough not to fall in the path of the light.

The slits 52 and 52' are provided for another light source and its co-operative aperture, which are not shown, and it is to be noted that the bottoms of the slits 52 and 52' also never cut into their co-operative light beam, to avoid producing additional harmonics due to irregularities in the slits.

The light choppers are journalled at a predetermined distance from the light aperture shield for the purpose of avoiding a siren-like whistle. 53 represents a glass or celluloid disc which is placed over the apertures as 48, 48', 50, etc., to prevent whistling noises when the light chopper revolves at high speed.

In the side elevation of Fig. 6, the transparent material 54 is placed in front of light chopper 21.

22' represents an additional cathode, which is provided so that the photosensitive element 22 can be used for two light choppers as 21, working from front and back.

Figure 8:
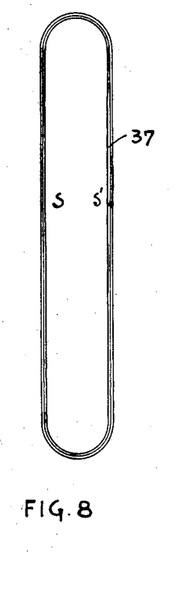
Fig. 8 represents an endless belt for driving the light choppers.

Fig. 8 represents an endless belt drive which is made of tape of single ply, or so-called "friction tape", which is spliced without overlapping, so that its thickness is uniform, see splices S and S'.

Figures 9, 10:
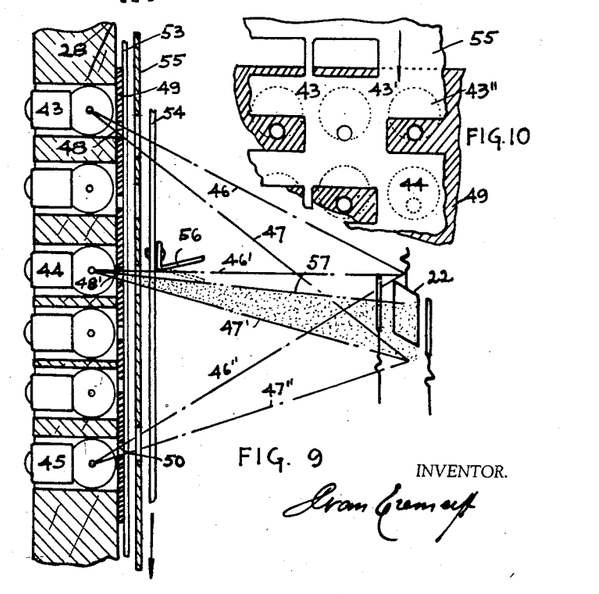
Fig. 9 shows the adaptation of a perforated belt or drum instead of discs as light choppers.
Fig. 10 is a detail of part of Fig. 8.

Fig. 9 shows what is in Fig. 6, only that it is adapted for a running belt or a drum, in place of the circular disc. The moving perforated belt 55, which is provided with a plurality of slits of doubling number, similar to the slits of the discs described above, moves in the direction indicated by arrow. The belt 55 can be substituted by a drum, which also has slits similar to those of the disc 21, described above, the slits of said belt or drum having arrangement such as shown in Fig. 10.

The intensity adjusting means 56 is provided instead of painting on a transparent shield as 54, as in Fig. 6, so that when the small flap of 56 is bent downward, light from the filament of light source 44 is cut to line 57 for reduction of intensity of light falling on the photosensitive element 22.

Figure 11:
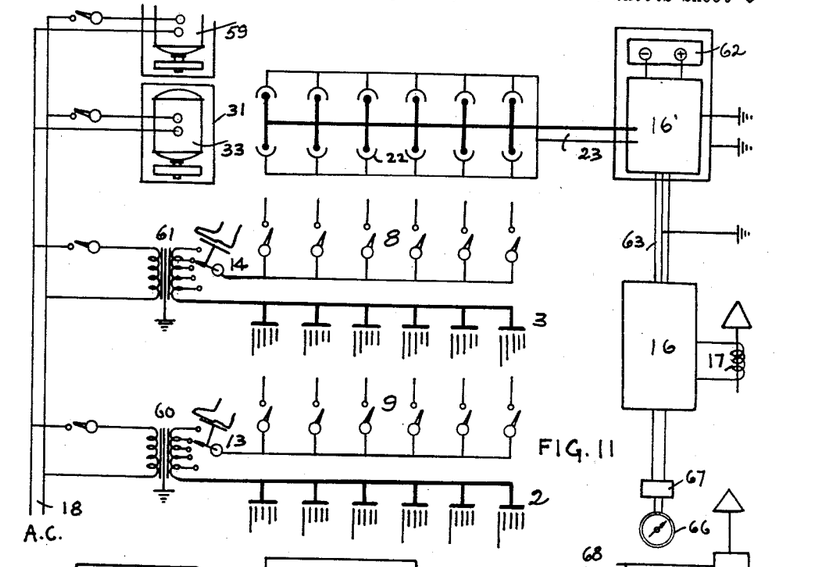
Fig. 11 is a diagrammatic view of the electronic sound generating and synthesizing system as it is operated on alternating current, also showing volume controlling means and synchronizing means.

In Fig. 11, the alternating current line 18 supplies the synchronous or induction repulsion motor 33, and the motor of a similar instrument, in case two or more instruments are played at one time, when all instruments run in perfect synchronism to produce International Pitch, A-440. The transformer 60 supplies alternating current of reduced voltage to keyboard 2 and transformer 61 supplies alternating current of reduced voltage to keyboard 2. The details of wiring of the stops 8 and 9, and the wiring of keyboards 2 and 3, will be described later.

The preamplifier 16' has the battery 62 connected by line 63 to the distant amplifier 16 and loudspeaker 17. The galvanometer 66 with rectifier 67 is provided for the purpose of adjusting the light intensities of the beams falling on the photosensitive elements. It is to be understood that the illuminating lamps in combination with photosensitive elements, in instruments of this kind, are generally operated on direct current to avoid additional hum, while I use alternating current, since the hum is modulated by the light choppers and by using low-voltage lamps. Thus, the percentage of hum heard in the sounds is permissible. Photosensitive elements must operate on alternating current in order to make the instrument compact and portable, eliminating the necessity of providing bulky batteries for direct current. Any alternating current hum is suppressed by the special design of the light choppers and by running them at a very high speed. Also, this system employs low voltage lamps for suppressing alternating current hum, plus eliminating the presence of alternating current hum in the keying and stop circuits, when not used, diagrams of which will be given later. The usage of alternating current allows the possibility of large consumption of current, which, if batteries were used, would involve much bulkiness, weight, and added expense, the avoidance of which is one of the main objects of this invention. Of course, when the light choppers are stationary, and the lamps are flashing, an alternating current hum can be heard.

Figure 12:
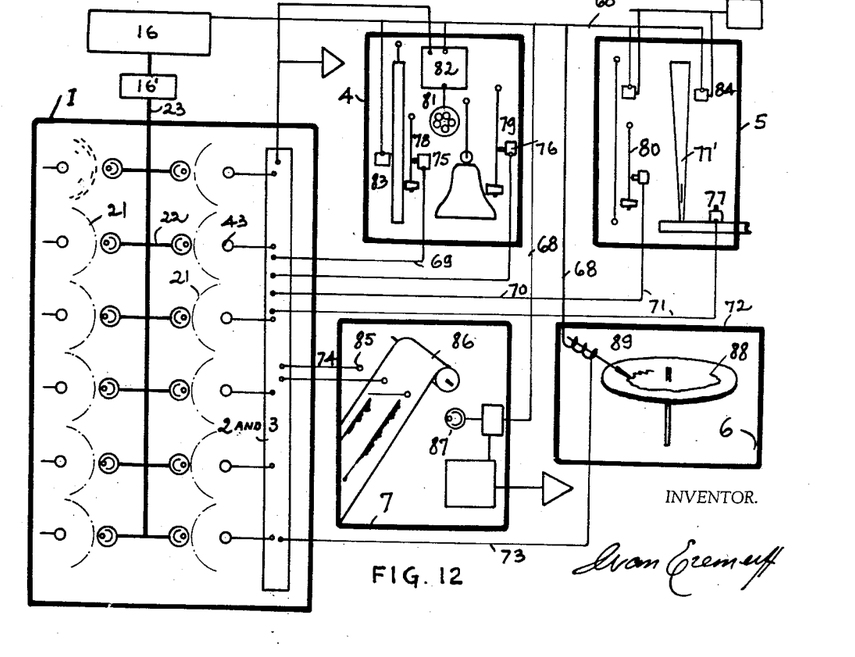
Fig. 12 illustrates how the centralized synthetic electronic sound producing unit is combined with some of its distant tone producing and reproducing systems, which are controlled from the keyboards of said centralized unit.

Fig. 12 illustrates the centralized unit housed in the console 1, having connection with the distant sound producing and reproducing systems 4, 5, 6, 7, etc., connected by line 68 to the main amplifier 16. Lines 69, 70, 71, 73, 74, connect to the keyboards 2 and 3 of the centralized instrument, so that when any predetermined key in either of the keyboards is depressed, the electromagnetic actions as 75, 76, 77, which are similar to those of conventional pipe organ practice, strike the hammers as 78, 79, 80, or open air valves for the organ pipes as 77', and said hammers hit suitable chimes, bells, strings, etc., as in present day pipe organs.

Microphone 81, which is connected in line 68, and, if necessary, to amplifier 82, detects and picks up sounds. The piezo-electric pick-ups as 83, 84, are made to pick up vibrations when the microphone pick-up is super-sensitive, or if the vibrations are too powerful for the microphone, or if the outputs of the sound or the vibrating energies from different sounding bodies are housed near each other in the same space, a plurality of pick-ups, either microphone or piezo-electric, are employed. In the housing of the system 7, the light sources as 85 are made to flash upon operation of the keys of keyboards 2 and 3, for illuminating predetermined tracks on the revolving film 86. Impulses which are produced by variable density or variable area tracks on said film, are detected and picked up by the photosensitive element 87, which has its own amplifier if necessary. This instrument plays record of recorded tones and music or produces effects according to the wave sound tracks synthetically made on film 86. This feature is disclosed in by patent application allowed March 15, 1934, Serial Number 715,656. In the housing 6, one or more phonograph records as 88 are provided with suitable recordings. The pick-up device 89 is connected to the amplifier 16 and the keyboards 2 and 3, at predetermined desired intervals, by connecting or switching on the line 73.

Figure 13:
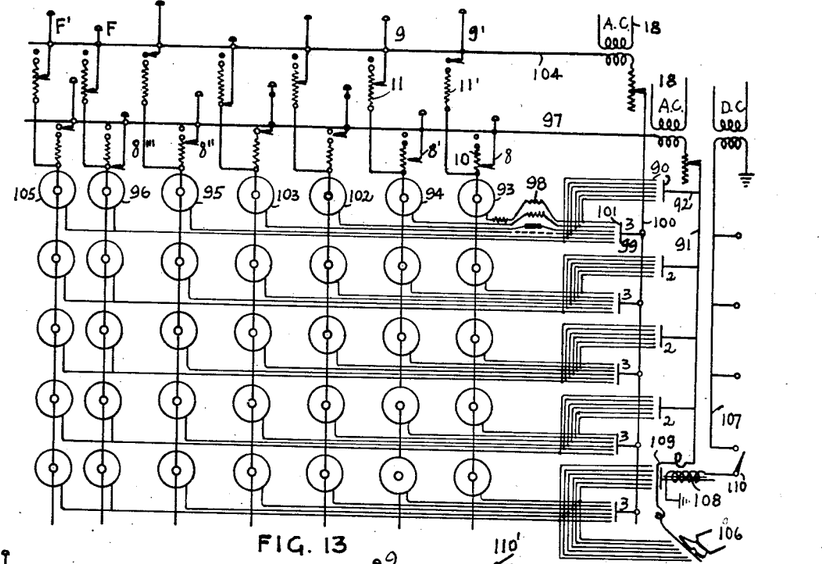
Fig. 13 is a diagram to illustrate the wiring of keys and stops of this system, the keys having multi-switches and the stops having single switches for two sets of keys.

Fig. 13 illustrates a wiring diagram of the light sources, which are placed before twelve light choppers which are running at different speeds due to the different diameters of their cooperative pulleys. The ratios between the different pulleys are described in my patent of August 29, 1933, Number 1,924,713. Each key such as 90, controls a plurality of light sources which are placed at different light choppers, so that, for example, when key 90 is connected to line 91, by 92, the lamps 93, 94, 95, 96 will flash, since the stops 8, 8', 8'', 8''' connect those lamps with line 97. Each stop, of course, has adjustment of intensity.

For simplicity of explanation, the light sources shown in Fig. 13 are arranged in a straight line, while, in the actual instrument, these are scattered over different parts of the revolving light choppers, so that each light source is stationed before its co-operative row of slits, for producing its own predetermined frequency. This is shown more in detail in Fig. 16.

Beside having its individual intensity adjusting means, each lamp is also provided with a resistor in the junction box 98. In order to flash another combination of lamps before the same light choppers, keyboard 3 is provided with stops as 9 and 9', so that when key 99, for example, is depressed, current from line 100 passes into key 101, and into stop 9, which co-operates with the intensity adjustment 11. Light source 94 flashes, while light source 93 does not, since stop 8' is not connected to line 104. Also, lamps 102, 103, and 96 will flash due to the setting of the stops as 9 and 9', on line 104. Due to the two independent keyboards, two rows of stops are provided, each stop having independent adjustment. Lamp 96 is used as a fundamental, and in case it burns out, it is replaced by another lamp such as 105. The stops F and F' are used for fundamental purposes only.

For the purpose of producing staccato effects, single light wire filament lamps are used. For producing diminishing effects, single heavy wire filaments are used, and this feature pertaining to the different types of filaments, and their purpose, has been previously described in the objects of this invention.

In some cases, the musician desires to follow the methods of the organ, by playing low tones with the aid of pedals, as well as keys. For this purpose, pedal actuated keys such as 106 are provided. If the keyboard such as 107 is used alone, operating from an instrument at a distance, a multi-wire cable is provided for connecting said distant instruments with the keyboards and the pedals, by an arrangement such as 108, using an electro-magnetic plunger for connecting line 91 with key 109, if switch 110 of the distant instrument keyboard 107 is closed.

Figure 14:
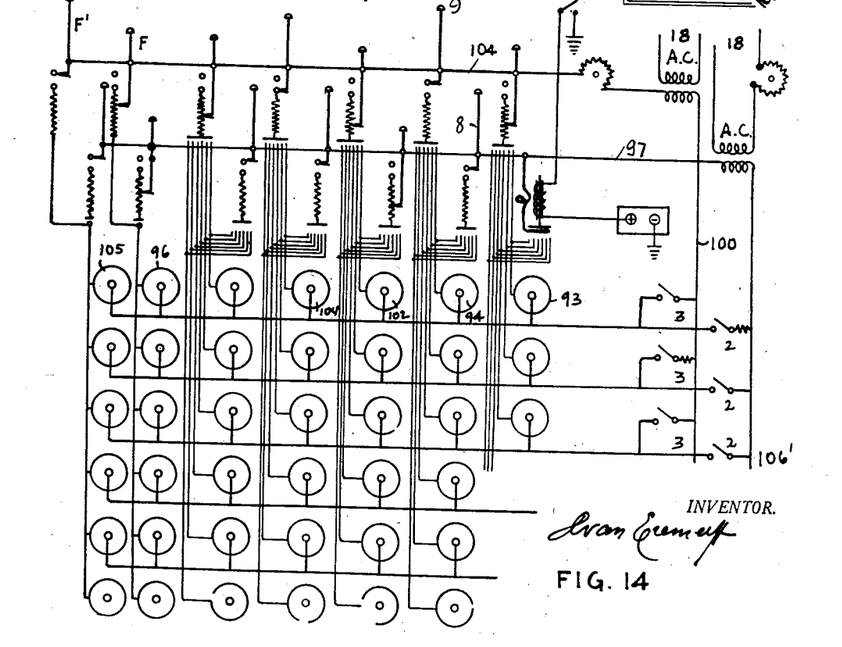
Fig. 14 shows the keys having single switches and the stops having multi-switches.

The arrangement shown in Fig. 14 resembles that of Fig. 13. However, in Fig. 14, the key action is relieved of multi-wiring and is made in more simplified manner, while the stops, which are generally stationary, are made in a multi-switch arrangement, the distant keying being the same as shown in Fig. 13, however, applying to the stop instead of to the key. The diagrammatic symbols plainly explain the operation of this modification and anyone skilled in the art can understand readily the relation between Fig. 13 and Fig. 14.

A pedal can be provided to the key as shown by 106', similar to 106 shown in Fig. 13.

Figure 15:
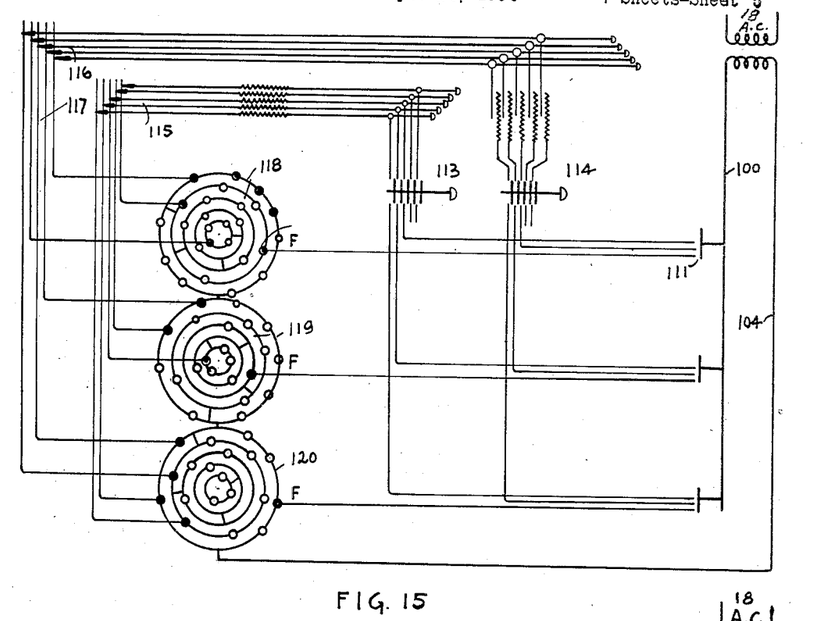
Fig. 15 illustrates keys and stops having connections for multi-switching.

Fig. 15 shows what is illustrated in Figs. 13 and 14; however, key 111 connects with line 100 by shortening, while the stops 113 and 114 do not shorten, but permit the passage of current to each key individually by multi-jack switch action. The selective adjustments 115 and 116 permit of choosing connections with the lines 117 which lead to different rows of lamp banks as 118, 119, 120, which are placed before their co-operative light choppers. This modification provides choice of connections for synthesis of different frequencies, adjustable instead of fixed, as shown in Figs. 13 and 14.

Figure 16:
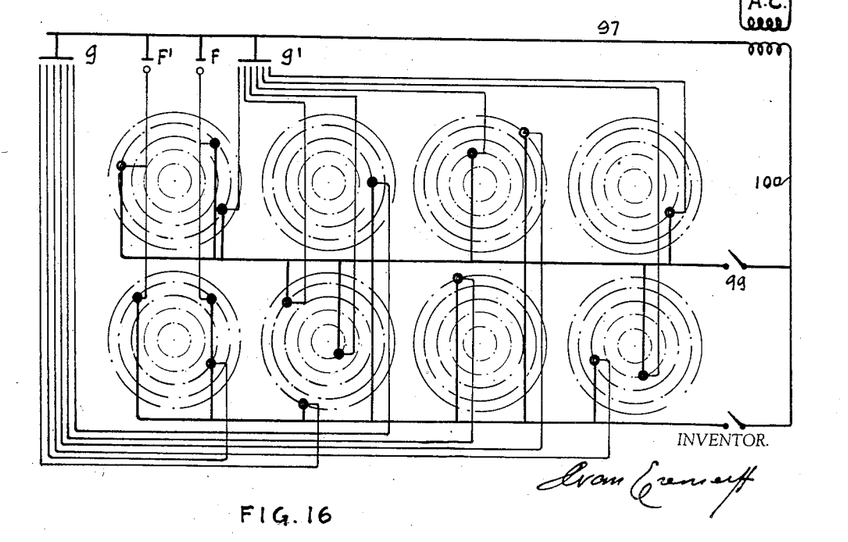
Fig. 16 shows the wiring between several light choppers, as in Fig. 13 and Fig. 15, showing the wiring as it is in the actual instrument, instead of symmetrically, as in Fig. 13 and Fig. 14.

Fig. 16 is a simplified modification showing the scattered light sources as they are connected in the actual instrument, without details as in Figs. 13 and 14. Figs. 15 and 16 are shown for the purpose of better understanding what is in Figs. 13 and 14.

Figures 17, 18:
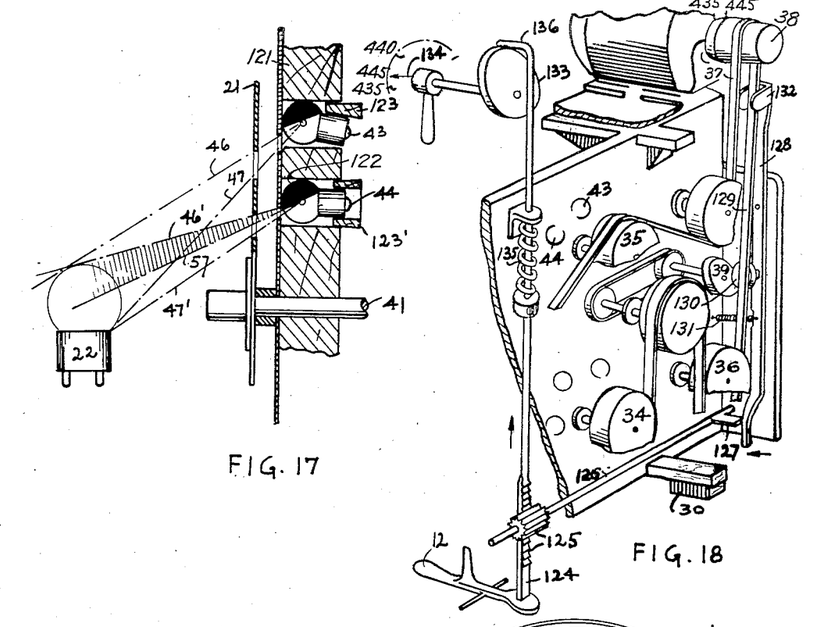
Fig. 17 shows intensity adjustment of individual light sources.
Fig. 18 illustrates a tremolo mechanism with a device for setting International Pitch, A-440, and for sharping and flatting International Pitch, A-440.

Fig. 17 represents means for individually adjusting the intensity of illumination of the lamps as 43, 44, on the photosensitive element 22. Each lamp is partially coated with paint as 121, 122, which cuts off light from 46' to 57, when said lamps have been turned for adjustment. Later, said lamps are wedged securely by peg 123 or by the tapered bushing 123'.

Fig. 18 illustrates the tremolo device. When pedal 12 is depressed, rod 124 is pushed upward in the direction indicated by arrow 124', through gear and rack 125, revolving shaft 126, releasing trigger catch 127, so that the rocking arm 128, which is mounted on pivot 129, rocks in the direction indicated by arrow 128', by the continuously moving cam 39, as in Fig. 5, with the aid of roller 130, providing that the trigger catch turns away from the rocking arm 128. Spring 131 keeps roller 130 pressed against cam 39. Rocking arm 128 has two plates as 132, which engage with the endless belt 37 for the purpose of moving said belt back and forth on the face of cone pulley 38. This action permits of increasing and decreasing the speed of all the pulleys 34, 35, 36, simultaneously, thus varying slightly the frequencies in all the keys in a fluctuating manner. Cam 133 is adjusted by knob 134 in the position where the indicator points to A-445 cycles, so that when the foot discontinues depressing pedal 12, pin 124 is pushed downward by spring 135 until catch 136 of pin 124 rests with belt 37 at a definite diameter of cone pulley 38, where the diameter of the pulley is of such size that it tunes the entire instrument to International Pitch, on the sharp side. By placing the indicator at A-435, catch 136 is placed at the lowest position of cam 133, of course, lower than where it was placed for A-445 and 128 positions belt 37 at a smaller diameter on cone pulley 38, lowering the speed of all light choppers as 21, thus flatting International Pitch to A-440.

When the indicator of knob 134 points to A-445, catch 136 rests on the lowest position of cam 133, thus displacing belt 37 to a larger diameter of the cone pulley 38, thus increasing the speed of all light choppers to produce a higher pitch than A-440.

Figures 19, 20, 21:
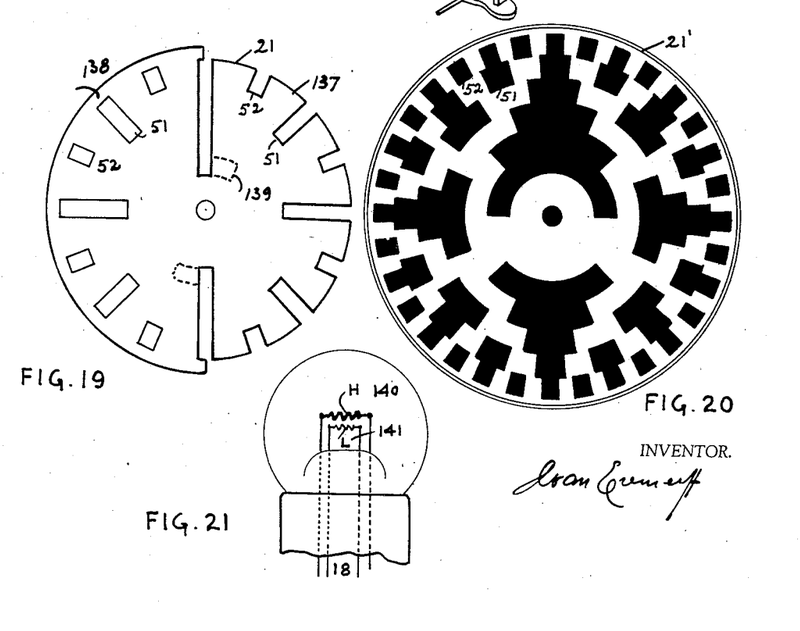
Figs. 19 and 20 are designs of disc light choppers.
Fig. 21 represents a light source with a heavy and a light wire filament.

Fig. 19 shows a light chopper with slits of uniform width for high and low frequencies. The portion at the right as 137 has slits cut through to the edges, while portion 138 has slits punched, with the outer edging provided with an extra stiffness. The low tones can be increased in volume by opening the slits as indicated by 139.

Fig. 20 shows a light chopper 21' with spaces and slits of equal dimensions arranged in design for practical punching.

Fig. 21 represents a light source with two filaments, H-140 being a heavy wire filament, and L-141 being a light wire filament. 140 is provided for stop F" and lamp 105, and 141 is provided for stop F' and lamp 96. Both filaments are connected to separate circuits; for example, the circuit of stop F' controls the fundamentals of light wire filaments, and the circuit of stop F" controls the fundamentals of heavy wire filaments. The action of producing staccato and diminishing effects has been described previously.

Figure 22:
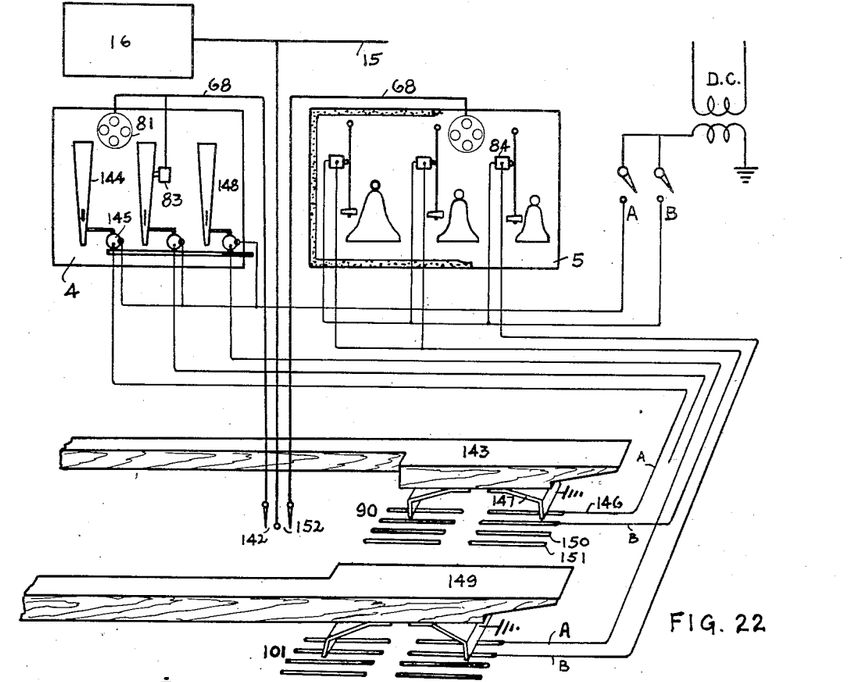
Fig. 22 shows an arrangement of a plurality of distant tone producing and generating systems and keys of the centralized tone generating and synthesizing system.

In Fig. 22, 4 and 5 represent distant instruments which have been shown in assembly in Fig. 1. These instruments have outlet connections 15 to amplifier 16. These instruments are sound-proofed for silent operation, by means of felt padding, or other sound deadening materials as 5'.

Line 68 connects microphone 81 and piezoelectric pick-up 83 with switch 142 of keyboards 2 and 3, shown in Fig. 1. Sound is thus picked up when key 143 is depressed and either of the pipes as 144, whose pitch corresponds to key 143, is made to sound when the electro-magnetic action 145 is actuated by electric current from line 146. Of course, key 143 connects contact of 146 with the grounded plate 147. Pipe 148 is pitched to key 149 and works in the manner of pipe 144. Instrument 1, beside having a set of pipes, may have a set of bells and chimes as known in conventional pipe organ practice, such as shown in Fig. 12, which may connect by stops similar to A and B to contacts 150, 151, respectively, which are provided for each key for the purpose of playing, by the same key, a combination of different qualities. Instrument 5 has a microphone pick-up or piezo-electric pick-up as 84, controlled by switch 152, connecting with a set of bells or pipes or strings, etc., one quality being controlled by stop B, as shown with regard to bells, and another quality, such as pipes, being controlled by stops similar to B. This diagrammatic connection clearly shows further details of operation of the centralized instrument with keyboards as represented by keys 143 and 149, and distant instruments with pick-ups and electro-magnetic actions.

Figure 23:
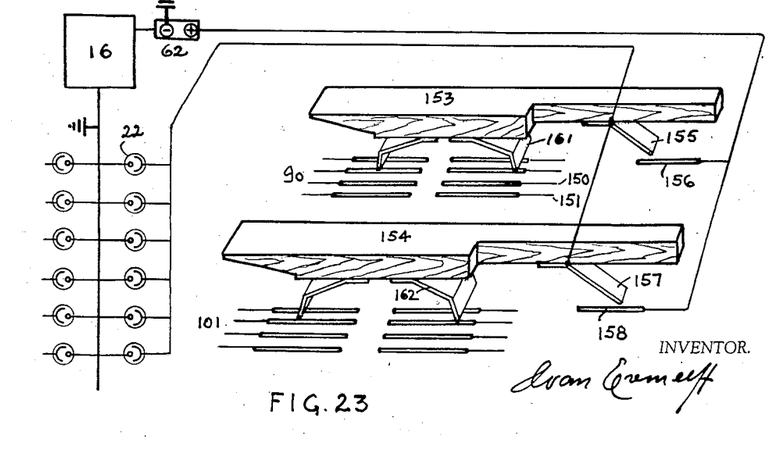
Fig. 23 is an arrangement for producing different attack effects.

In Fig. 23, 153 and 154 represent keys of keyboards 2 and 3, as shown in Fig. 1, which have conventional contacting plates and contacts as 150, 151, which have been described previously. Plate 155 and contact 156 and 157 and 158 are made to connect, after plates as 161, 162 connect to their cooperative contacts. This is provided so that connections are first made to light sources or distant instruments and later, 155 contacts with 156 or 157 contacts with 158, for switching photosensitive element current from supply 62 to the current of photosensitive elements 22. A sudden rush of current into the photosensitive elements creates a percussion effect, especially when music is played by successive tones keyed on the keyboards.

Having thus described my invention, what I claim as new and useful is:—

1. An electrical tone producing musical instrument, comprising means for generating light impulses of predetermined frequency and intensity a plurality of light choppers, means for periodically increasing and decreasing the speed of all said light choppers, a plurality of keyboards, a plurality of stops, a plurality of light sources, controllable by keys in said keyboards, and by said stops, a plurality of keyboards, interdependent pedal means for controlling the intensity of the tones of their cooperative keyboards for the purpose of playing tones at a predetermined volume for solos and another predetermined volume for accompaniments, a mixer for synthesizing the tones in said musical instrument, on raw alternating electric currents of low voltage of one predetermined frequency, said currents being used only for lighting, mixing, and keying, a plurality of electric lamps with light and heavy wire filaments for producing staccato and diminishing effects in said electrical tone producing musical instrument, a plurality of photo-sensitive elements, means for producing attack effects, and common amplification and sound emitting means.

2. An electrical musical instrument comprising a plurality of light choppers, said light choppers having a predetermined fixed design, for producing tones electrically, each of said light choppers having radial slits of predetermined size and shape for avoiding the generation of parasitic disturbances, a plurality of pulleys for driving said light choppers, a single endless driving belt of uniform thickness for driving said pulleys, each of said pulleys having a predetermined diameter which is proportional to the frequency of a musical tone which it represents, and the thickness of said belt being compensated for proportionally, depending on which side of said belt contacts each of said pulleys, a plurality of photo-sensitive elements connected in parallel, a common preamplifier and amplifier for all said photo-sensitive elements, a synchronous motor for driving all said light choppers at constant uniform speed, for maintaining International Pitch, A–440, without flatting or sharping said pitch, regardless of voltage fluctuation in the alternating current main to which said motor is connected, a cone-shaped driving pulley for said synchronous motor for producing speed variation of said light choppers when said endless driving belt is periodically displaced from one diameter of said pulley to another, a hand lever and pedal operated tremolo clutch for periodically displacing said endless driving belt on said motor cone pulley, and also for maintaining said driving belt at a predetermined fixed diameter of said cone pulley when steady predetermined tones are desired, a common supporting panel for said motor, said light choppers, said tremolo clutch, and said photo-sensitive elements, and a common light and sound proof housing for said common supporting panel.

3. An electronic musical instrument for producing musical tones electrically, comprising one and more manuals and one and more banks of stops, for switching off and on a plurality of light sources at predetermined intensities, a plurality of light choppers of predetermined design for producing pulsating electric current of predetermined wave form, said light choppers being journalled at different speeds, for cutting light which is projected through them, at predetermined fixed frequencies, a mixer for producing various combinations of light flashes of said light sources, a raw alternating electric current power supply for feeding the circuits of said mixer for operating said light sources in conjunction with a plurality of photo-sensitive elements, double filament light sources with light and heavy wire filaments for producing staccato and diminishing tonal effects, means for adjusting the intensities of said light sources, a plurality of branch circuits, each said circuit comprising multi-switches for a plurality of stops with pre-set and adjustable combinations, and multi-contact switches for a plurality of keys, all said light sources and circuits being operated by alternating current in conjunction with said photo-sensitive elements.

4. In combination, an electronic musical instrument for producing tones electrically, comprising a plurality of instruments for picking up tones electrically, and a plurality of instruments for reproducing tones electrically, all said instruments having a common amplifying and sound emitting system, said electronic musical instrument having a common console with a plurality of keyboards for the centralized playing of said tone producing, tone pick-up, and tone reproducing instruments, said centralized keyboards controlling the circuits of said tone producing instrument by controlling the illumination of a predetermined number of electric lamps of predetermined size and predetermined design, said circuits of said keyboards being fed by raw alternating current from one and more step-down transformers, the primaries of which are connected to standard alternating lighting current on one fixed frequency, the keys of said centralized keyboards in said console having means for switching on and off the circuits of different distant electrical pick-up and electrical tone reproducing instruments, means for producing attack effects in said tone producing instrument by additional switches of each key of said centralized keyboards, means for operating a predetermined number of keys of said centralized keyboards from a distance, and manual and pedal means for closing and opening the circuits of said centralized keyboards for said tone producing, tone pick-up, and tone reproducing instruments which are predeterminedly pitched to correspond to the keys of the centralized keyboards.

5. An electronic musical instrument comprising a plurality of light choppers with radial slits for the purpose of avoiding the generation of undesirable harmonics, a plurality of pulleys of different diameters, each said pulley cooperating with its own light chopper of predetermined speed, a single endless belt of uniform thickness for driving all said light choppers simultaneously, a brushless synchronous motor for maintaining International Pitch, A–440, in said electronic musical instrument, a cone-shaped driving pulley for predeterminedly varying the speed of said light choppers, a pedal operated clutch for starting and stopping the means for periodically displacing said endless belt at different diameters of said motor driving cone-shaped pulley in order to produce tremolo in the tones generated, manually operated means for sharping and flatting the International Pitch of said instrument, to provide for playing with conventional musical instruments which may be tuned differently, or when atmospheric conditions detune such conventional instruments, a common supporting panel for housing the bearings of said light choppers, said tremolo means, said motor drive, said pedal supports, and individual light sources with their wiring, a plurality of light sources which are predeterminedly cooperating with said light choppers, said light sources being radially positioned for their own cooperative light choppers, for projecting their filaments on a photosensitive element located in the center of its cooperative light chopper, a plurality of photosensitive elements, a plurality of masks, one for each light chopper, for projecting the filaments of said light sources through their own cooperative light choppers and on their own cooperative photosensitive elements, means for individually adjusting the intensities of said light sources, each said light source having light and heavy wire filaments for the purpose of producing staccato and diminishing effects in the tones produced, the wiring and the mixer for said light sources having raw alternating current for lighting said light sources, by manuals, pedals, and distant electromagnetic keyboard attachments, said manuals having multi-switches and single switches for each of its keys, means for producing attack effects by individual keys which are wired for connecting and disconnecting a common polarized electric current of said plurality of photosensitive elements, a plurality of distant tone pick-up and tone reproducing instruments which are individually isolated from each other, each having individual sound pick-ups and electro-magnetic actions for mechanical and acoustical tone production, individual wiring for said tone pick-up and tone reproducing instruments, leading to the manuals of the centralized instrument, and a common amplifying and tone emitting system for said centralized instrument and said tone pick-up and tone reproducing instruments.

6. An alternating current and photocell operated electronic musical instrument comprising a plurality of switching and stop means for controlling predeterminedly wired circuits, one and more step down transformers for supplying said circuits and said switching means with alternating current of fixed frequency, a plurality of electric lamps with filaments of predetermined weight, connected by said circuits, independent adjustable means for supplying predetermined branch circuits with stronger and weaker alternating currents for producing predetermined sound levels in the playing of solos and accompaniments, a synchronous motor for driving a plurality of light choppers of predetermined design, a plurality of light choppers of uniform design for producing electric current of predetermined wave form and also for modulating said alternating current hum, a plurality of masks, one for each light chopper, with apertures for limiting and projecting light from a plurality of electric lamps behind them, the light from said lamps being projected through the slits of their cooperating light chopper, a plurality of photocells, connected in parallel to an amplifying and sound emitting system for the conversion of electrical energy into sound energy, by said photocells.

7. In combination, an electronic music producing unit and a plurality of distant electronic music generating and reproducing units, comprising a common console with a plurality of keyboards, each keyboard having a plurality of stops, each keyboard also having individual volume control and volume and tremolo controls which are common for all said keyboards, a photo-electric tone generating unit, a plurality of distant independent acoustical tone generating units and electrical pick-up and tone reproducing units, individual wiring from each of said distant tone generating and reproducing units to said plurality of keyboards of said common console, a common amplifying and sound emitting system for said electronic music producing unit and said distant acoustical tone generating and electrical pick-up and tone reproducing units, means for maintaining perfect tuning in said electronic music producing unit and said distant tone generating units, and means for altering the International Pitch in said electronic music producing unit to conform to the pitch changes in said distant tone generating units.

8. In combination, a centralized electronic musical instrument for synthetically and photo-electrically producing tones, and a plurality of tone pick-up and electrical sound on film and phono-groove reproducing instruments, comprising a centralized console with a plurality of manuals and a pedal clavier, electrically fed by said instruments to the keys and pedals of said plurality of manuals and said clavier, a plurality of electric tone generators, switches and wiring for said tone generators to said centralized console, electrical tone pick-up, wiring, and switches for said pick-up to said centralized console, means for selecting tone qualities on said centralized console, means for producing resonant living tones by pitch-changing tremolo means, means for controlling the intensity of tone, independently on each manual of said centralized console, means for wiring all of said instruments to said centralized console, and common amplifying and sound emitting means for all instruments, through said centralized console.

9. An electronic tone producing musical instrument comprising a synchronous motor, a plurality of light choppers driven by said synchronous motor, a plurality of keyboards, a plurality of electrical lamps, electrical wiring circuits for said plurality of lamps, said circuits comprising two-way switching means, one being a single-contact switching means for said keyboards, and the other being multi-contact switching means for a plurality of stops which cooperate with said keyboards, said multi-contact switching means for said stops being predeterminedly pre-set in the number of their lamps, each key with said single-contact switching means having fixed resistance for adjustment of intensity of current passing through it, and each keyboard having individual variable adjustment of the intensity of current passing through it, each stop with multi-contact switching means having individual adjustment for controlling the intensity of current passing through it, said multi-switching means of said stops being operated over distances by cooperative individual switches, an individual alternating current power supply for each of said keyboards and for their cooperative stops, a plurality of photosensitive elements each said photosensitive element cooperating with its own light chopper, and common amplifying and sound emitting means for said plurality of photosensitive elements.

10. A unit for photoelectric tone generation of predetermined frequencies, comprising a housing for a plurality of electric lamps which are predeterminedly wired to their electric current supply, said housing having bearings, a shaft journalling in said bearings, said shaft having on one end a pulley of predetermined diameter and on the other end a flat slitted disc which is securely fastened to said shaft, a stationary mask with a plurality of apertures, one aperture for each lamp placed behind it, said apertures permitting the passage of light from the filaments of said lamps onto the photosensitive element placed centrally in front of said disc, a photosensitive element for responding to direct and reflected light, a shield between said disc and said photosensitive element for adjustment of the intensity of light falling on said photosensitive element from said electric lamps through the slits of said disc, also eliminating siren noise from said rotating slitted disc.

11. A unit for photoelectric tone generation, comprising a housing for a plurality of electric lamps, wiring to the keys and stops cooperating with said unit, said housing having bearings for journalling a rotary shaft protruding from both ends of said housing, one end of said shaft having a pulley of predetermined diameter and predetermined width for driving said shaft at a predetermined speed by an endless belt of uniform thickness, the other end of said shaft having a disc light chopper with slits of predetermined shape for producing light impulses at predetermined intervals of time, said intervals being proportional to the fraction of time in which impulses are not produced, said disc light chopper predeterminedly modulating the wave form of the electric current into which said light impulses are converted, said light chopper also predeterminedly modulating the alternating current hum which results from the operation of said lamps in conjunction with a photosensitive element on raw alternating current, each of said lamps having light and heavy filaments for the purpose of producing responsive and delayed light flashes, means for adjusting the intensity of light falling on said photosensitive element, and means for avoiding additional harmonic generation by utilizing the sides of the slits of said light chopper to open and close the light of said lamps.

12. An electrical musical tone generating unit with light as the keying medium for generating a predetermined number of pulsating electric currents of predetermined frequencies and intensities photoelectrically for the production of musical tones at International Pitch, without variation on the sharp or flat side, comprising a common housing for a plurality of electric lamps with filaments of predetermined size and weight, said lamps having one or more filaments of different weights for producing responsive and delayed flashes of light in said lamps, each of said lamps being inserted in said housing so that the filaments of said lamps are projected to the center line of said housing with the aid of a mask stationed in front of said lamps, through predeterminedly spaced apertures, one aperture being for each of said lamps, a mask for limiting and projecting light from said lamps, a photoelectric element located in the center of said housing for the reception of light from said lamps which is conically projected, a bearing housing in the center of said common housing, a shaft journalling in said bearing, both ends of said shaft protruding from said bearing housing, one end of said shaft having a pulley for carrying an endless belt of uniform thickness which is driven from a drive pulley of a synchronous motor of predetermined speed, said synchronous motor operating on impulses of electric current and not changing its speed from voltage variation, the other end of said shaft carrying a flat disc with apertures of predetermined shape, a disc light chopper with radially spaced apertures of predetermined shape for closing and opening light from the apertures of said light limiting and projecting mask, said light shining through said apertures only when said lamps are lit, a transparent shield located between said light chopper and said photoelectric element for avoiding the rotation of air and siren-like noises from said light chopper, and switching and wiring means for predeterminedly switching on and off one or more lamps in said housing.

13. In combination, an electric tone producing, electric tone pick-up, and electric tone reproducing instrument with a plurality of common keyboards and pedal claviers, and a common amplifying and sound emitting system, comprising a plurality of photoelectric tone generating units, a common synchronous motor and a single endless belt drive for said tone generating units, common means for producing variable pitch tremolo, a plurality of common keyboards and claviers and their cooperative banks of stops for switching on and off a predetermined number of tones produced by said photoelectric tone generating units and a plurality of pick-up and tone reproducing units, a plurality of electrical tone pick-up units, a plurality of electrical tone reproducing units, means for switching on and off said tone pick-up units and said reproducing units on their own cooperative keyboards, and means for predeterminedly and simultaneously playing electrically produced, electric pick-up, and electrically reproduced tones on said common keyboards and pedal claviers, through a common amplifying and sound emitting system.

14. In a multi-manual electric organ, a plurality of manuals, a pedal clavier, a mixer with a plurality of stops, a common tone generating unit feeding said manuals and said pedal clavier, a synchronous motor, variable pitch vibrato means, a plurality of electric tone producing and reproducing units controlled by said mixer, stops, manuals, and pedal clavier, and an amplification system and sound emitting means which are common to said tone generating unit and said plurality of electrical tone producing and reproducing units.

15. In a musical instrument for the production of tones electrically with pitch-varying tremolo, an electro-mechanical tone generating unit comprising a plurality of independent electrical tone generators, each revolving at fixed predetermined speed, and means for simultaneously and periodically raising and lowering the speed of said electrical tone generators for the production of electrical tremulant tones, each at predetermined periodically sharped and flatted pitch.

16. In an electrical musical instrument, a pipeless organ console, an electrical tone generating assembly inside of said console, common means for the production of a predetermined number of different electrically produced tones of steady acoustical fixed pitches, and means for the production of periodic fluctuations in the frequencies of said electrical tones without lowering or raising the steady acoustical fixed pitches of said electrically produced tones.

IVAN EREMEEFF.